Sept. 3, 1968 W. J. MACZKO ET AL 3,400,259

MULTIFUNCTION ADDER INCLUDING MULTISTAGE CARRY CHAIN
REGISTER WITH CONDITIONING MEANS

Filed June 19, 1964 4 Sheets-Sheet 1

INVENTOR.
WILLIAM J. MACZKO
BY WALTER R. LETHIN
Robert J. Zinn
ATTORNEY

INVENTOR.
WILLIAM J. MACZKO
BY WALTER R. LETHIN
Robert J. Zinn
ATTORNEY

Sept. 3, 1968 W. J. MACZKO ET AL 3,400,259

MULTIFUNCTION ADDER INCLUDING MULTISTAGE CARRY CHAIN REGISTER WITH CONDITIONING MEANS

Filed June 19, 1964 4 Sheets-Sheet 3

3,400,259

MULTIFUNCTION ADDER INCLUDING MULTISTAGE CARRY CHAIN REGISTER WITH CONDITIONING MEANS

William J. Maczko and Walter R. Lethin, Canton, Mass., assignors to Honeywell Inc., Minneapolis, Minn., a corporation of Delaware Filed June 19, 1964, Ser. No. 376,348
13 Claims. (Cl. 235—156)

A general object of the present invention is to provide a new and improved apparatus for manipulating electronic digital data. More specifically, the present invention is concerned with a new and improved apparatus for an electronic data handling apparatus which is characterized by the ability of the apparatus to perform a multiplicity of functions including both arithmetic and logical type functions.

In general purpose data processors, it is desirable to provide the user with a number of different types of instructions in order to carry out a general purpose purpose program. Typical of the type of instructions required the instruction for adding, subtracting, multiplying, substitution, selective gating, and the like. Each of these instructions may be uniquely represented by individual orders which a programmer may utilize in organizing the instruction format for a particular program. It has heretofore been the practice to implement these individual instructions in such a manner that, for all practical purposes, a separate set of logical circuitry is provided for at least the arithmetic and the separate logical functions to be performed. While this approach may simplify the design and organization of a general purpose processor, the resultant apparatus may be unduly expensive and cumbersome. It has been recognized that many of the individual operations performed within a data processor are performed in a sequential manner so that, when any one particular function is being performed by the processor, there may be a considerable amount of idle circuitry. The techniques practiced in the present invention take maximum advantage of common circuit elements that may be utilized for a plurality of functions so that a considerable number of arithmetic and control or logic functions may be implemented using the same basic combination of electronic circuitry.

Adding arrangements previously proposed have in general been implemented solely for the purpose of performing an arithmetic operation, namely addition and subtraction, on a block of input information. In these operations, a plurality of bits of binary or binary-coded decimal information constituting a first operand are added to or subtracted from a second operand constituting a similarly coded digital representation In arithmetic operations, the digital representation which constitutes the entire first and second operands may be viewed as being functionally interrelated. Thus, for the arithmetic sum of two operands the expression follows:

$$S_n=F\ (A_n, B_n, \overline{C_n}, C_{n-1}, \overline{C_{n-1}}\ .\ .\ .\ \overline{C_o}, C_o)$$

wherein $S_n$ represents the sum of any two bits, $A_n$, $B_n$ of the first and second operands, the sum being further dependent upon the carry and carry not signals generated for the lower order bits of the operands. Accordingly, in a binary add operation, digits are applied in pairs of increasing denominational significance to a first stage of a binary adder. If the results of the addition in its first stage equals or exceeds the denominational radix in which the digits are expressed, a signal is applied to a carry generating device and a carry value is propagated to the succeeding adder stage to modify the results of the addition effected to the pair of digits of immediately increased denominational significance and as generated therein.

In contrast to this, a logical operation may be viewed as a functional relationship established between the corresponding bits of two or more operands on an independent basis; that is, one wherein the result of the operation on a particular set of bits representing the two or more operands is not related to the results of an operation effected on the preceding set or sets of bits thereof. In the execution of a logical substitute operation, each bit position of an A operand is compared with the corresponding bits position of a variant character and a determination made to move or not to move the A bit to the corresponding position in the B operand in accordance with the representation of the associated variant bits. More specifically if the corresponding variant bit is a "1," the A bit is substituted for the corresponding B bit, while the B bit is preserved if the corresponding variant bit is a "0." Accordingly, the functional relation of the operands in a logical substitute operation may be expressed as follows:

$$LS_n=F\ (A_n, B_n, V_n)$$

where $LS_n$ refers to the *n*th bit of the resultant logical substitute expression, and $V_n$ represents the *n*th bit of the variant character. As normally implemented, the circuitry for effecting arithmetic operations is physically distinguishable from that utilized to perform logical operations.

Accordingly, it is a primary object of the present invention to provide electronic circuitry for performing arithmetic operations on a plurality of operands treated as a succession of interrelated digits of a binary-coded representation and alternatively, for utilizing essentially the same circuitry to perform certain logical operations on a plurality of operands treated as a succession of independent digits of a binary-coded representation.

A preferred embodiment of the proposed multifunction adder comprises first and second multiposition registers for storing a digital representation of an A and a B operand. The output from the A and B registers are connected as input signals to a carry chain generator. The carry chain generator comprises a multistage register in which each stage is further comprised of a plurality of gating devices conditioned by selective signals from the A and B registers. Also associated with each stage of the carry chain generator are gating means including a plurality of gating devices. These latter gating devices are conditioned by a plurality of signal operational inputs, each of which is associated with a separate logical function. When a particular logical operation is to be performed, a signal is generated on the appropriate signal operational input, or inputs, to thereby initiate the conditioning of the associated gating devices. The selection of a particular logical operation is in turn determined by a program instruction which also identifies the location in main memory from whence the data to be operated upon is stored. The conditioning of the gating means associated with each stage of the carry chain generator is accordingly effected by the information from corresponding bit positions of the A and B operands as well as signals defining any one of the plurality of logical operations. In the absence of a signal indicating a particular one of the logical operations, the electronic circuitry of the present system will function as a normal arithmetic device. Additional means are also provided to enable the arithmetic portion of the present invention to effect addition and subtraction in both binary and decimal modes.

Output signals from each stage of the carry chain register are combined with signals from the associated stages of the A and B registers and are entered as inputs to the corresponding stage of a sum register. The resultant representation from the plurality of stages of the sum register is transferred through a sum decoder register and thereafter returned to the main memory local register for subsequent storage in the location of main memory from whence the B operand originated.

Therefore, another object of this invention is to provide a gated logic type adder adapted to perform both arithmetic and logical operations which includes gating means associated with a carry generator which gating means, when conditioned by a signal input on any one of a plurality of signal input lines, indicates that a certain logical operation is to be performed and which, in the absence of any signal input, enables said adder to effect arithmetic operations.

Still another object of this invention is to provide a new and improved gated logic type adding device including means for implementing the foregoing objects, which means comprises a minimum amount of hardware and which means is adapted to operate in a minimum time.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
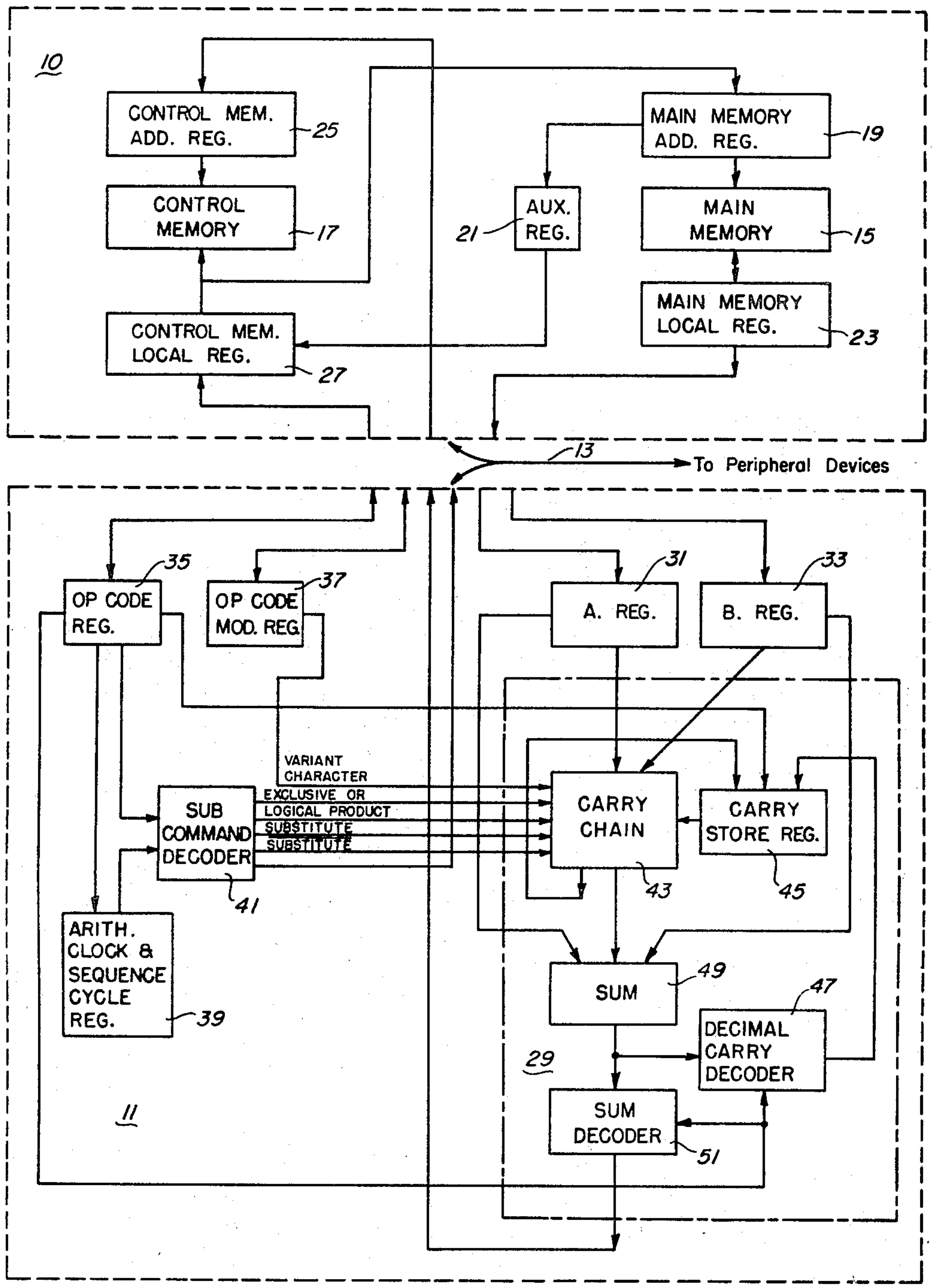
FIGURE 1 is a diagrammatic representation of a data processing apparatus incorporating the principles of the present invention.
Figure 3:
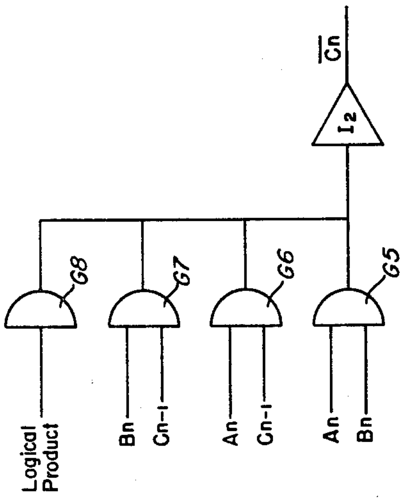
FIGURE 3 is a diagrammatic representation of logic circuitry for the nth stage of the carry chain generator of FIGURE 1.
Figure 4:
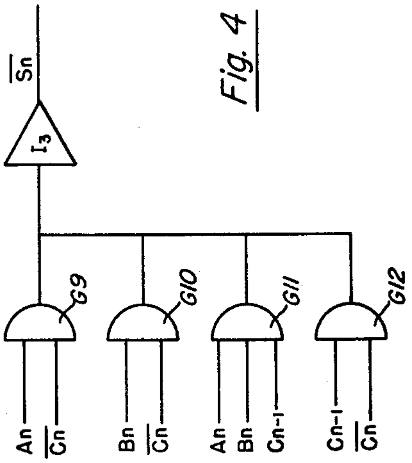
FIGURE 4 is a diagrammatic representation of logic circuitry for the *n*th stage of the sum register of FIGURE 1.
Figure 2:
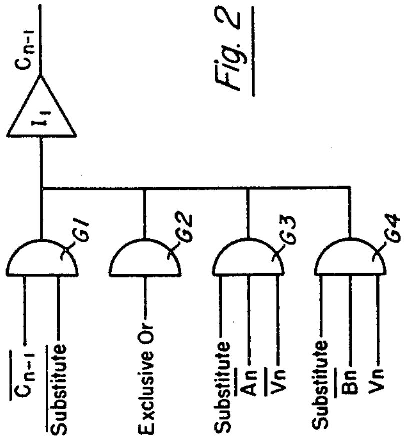
FIGURE 2 is a diagrammatic representation of logic circuitry for conditioning the carry chain generator of FIGURE 1.
Figure 5A:
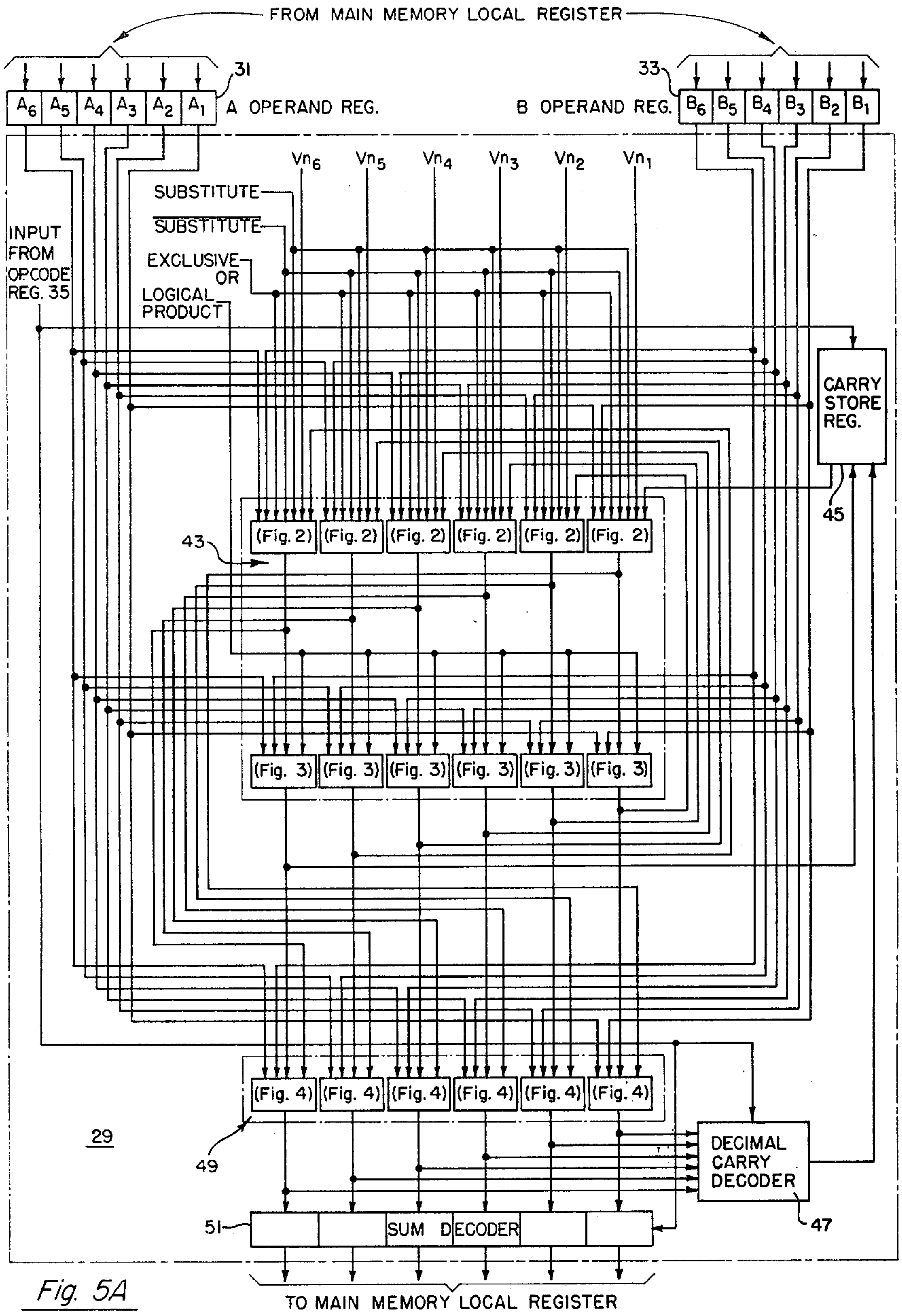
Figure 5B:
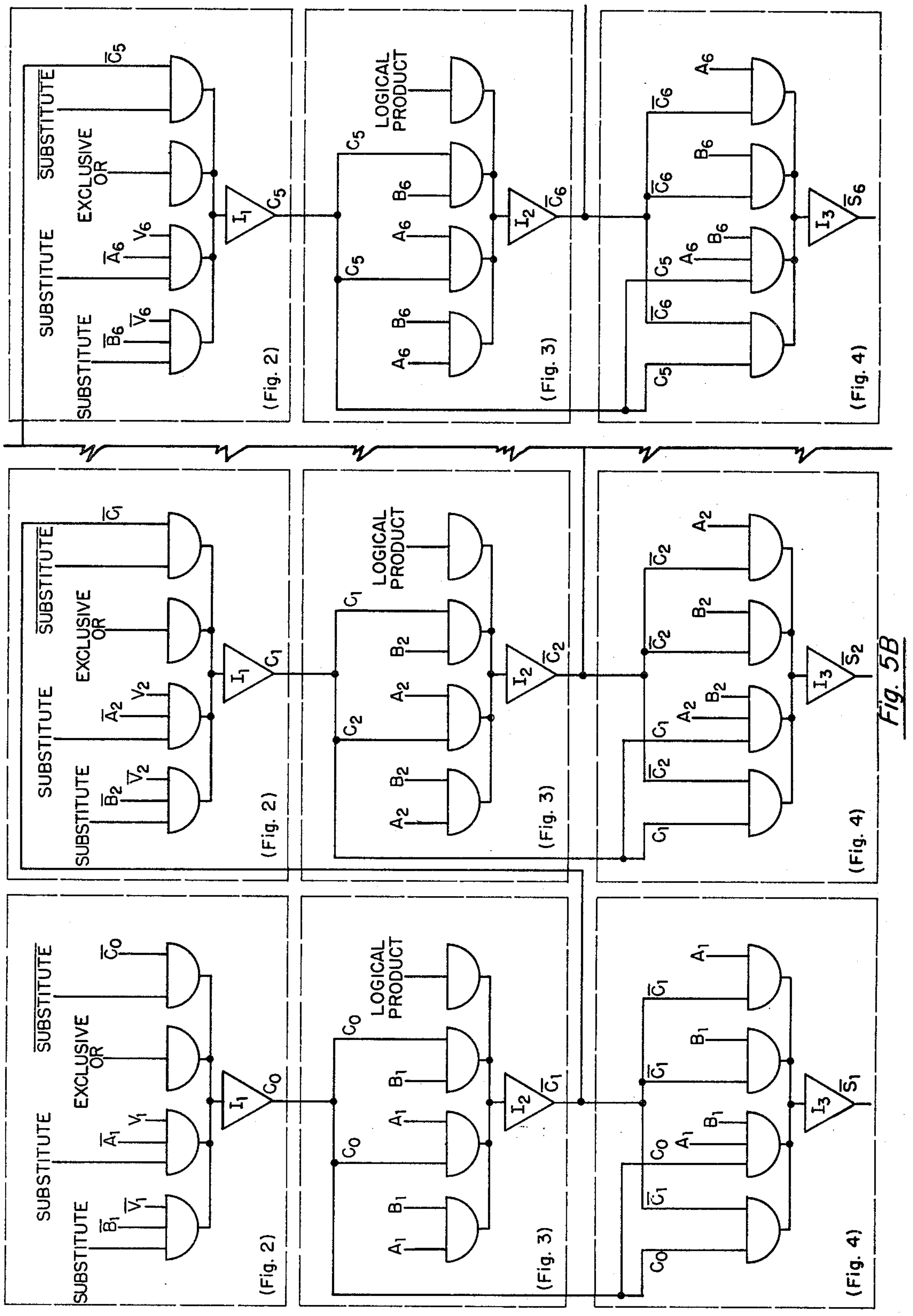

FIGURE 5A is a diagrammatic representation of the adder 29 of FIGURE 1, and depicts the interrelationship of data and control signals in relation to the multiple stages thereof; and FIGURE 5B is a diagrammatic representation showing the interrelation of the logical circuitry of FIGURES 2, 3 and 4 with respect to each other and with respect to adjacent stages of the adder 29 of FIGURE 1.

Referring first to FIGURE 1 therein is shown a portion of an electronic data processing system constructed in accordance with the principles of this invention and which comprises a central processor including a memory portion 10 and an arithmetic unit 11. The processing of a program instruction within the central processor will proceed in accordance with the basic mode of operation for this system as established in a copending application of Louis G. Oliari and Robert P. Fischer entitled "Information Handling Apparatus," Ser. No. 357,362, filed Apr. 6, 1964, now Patent No. 3,323,110. Therein is disclosed a new and improved data processing system which is particularly concerned with apparatus for transferring information to a plurality of peripheral devices via a limited number of read-write channels on a time-sharing basis. As disclosed in said application, successive memory cycle subintervals are allocated to particular ones of a plurality of peripheral devices programmed to operate during the time cycle uniquely associated with a particular read-write channel. The memory cycle subintervals allocated to a particular read-write channel found to be not in demand by an associated peripheral device are allocated to an arithmetic unit for the processing of additional program instructions and central processor orders. Logic means associated with the arithmetic unit are provided for processing the program orders and for performing certain arithmetic and logical operations.

In the illustrated embodiment of FIGURE 1, a line 13 is shown connecting the memory portion 10 and the arithmetic unit 11 to a plurality of peripheral devices, not shown. The peripheral devices may include magnetic storage units, card readers and card punches, random access units, intermediate drum memories, communication equipment and a variety of other special devices such as is disclosed in the copending application of Henry W. Schrimpf, filed Jan. 25, 1957, bearing Ser. No. 636,256, now Patent No. 3,201,762. These peripheral devices are capable of generating a variety of signals which, when transferred to the central processor via line 13, indicate the nature of the demands generated.

Considering in more detail the various components of a preferred embodiment of the present invention, FIGURE 1 discloses a main memory 15 which may comprise a multiplane coincident current core storage unit of the form described in the copending application of Henry W. Schrimpf, referred to above. Access to the main memory 15 from a control memory 17 may be provided by a multistage main memory address register 19 which contains the address of the location within main memory being referenced. Associated therewith is an auxiliary register 21 whose function it is to increment, decrement or transmit unchanged the contents of the address register 19 to a designated area of control memory 17. Information enters and leaves the main memory locations addressed by register 19 via a main memory local register 23 which also generates checking information pertinent to the data being brought into memory and rechecks the data as it is withdrawn.

Included in the control memory 17 are a plurality of multiposition storage registers each of which stores information pertinent to the processing of various program instructions. In this respect, all the program instructions are processed through the control memory which aids in the selection, interpretation and execution of these in order. In performing these functions, the control memory 17 coordinates the various activities of receiving data, effecting an inter-memory transfer within the central processor, and transferring processed data to the various peripheral devices. In a preferred embodiment of the present invention there are included in the control memory repertoire A and B operand address registers, sequence and cosequence registers, and present and starting location registers associated with each of a plurality of read-write channels utilized to communicate between main memory and the plurality of peripheral devices. The plurality of registers within the control memory 17 are addressed through a control memory address register 25. Information is transferred into the control memory from either the auxiliary address register 21 or the arithmetic unit 11 by way of a control memory local register 27. In addition, the control memory is capable of transferring any of its information into the main memory address register 19 for control thereof.

The arithmetic unit 11 of FIGURE 1 is basically composed of an adder 29 capable of performing both binary and decimal arithmetic, details of which are discussed more completely below. Two operand storage registers 31 and 33 are operatively connected to the input of adder 29 and provide means for storing the A and B operand data during the processing of program instructions. Two additional registers 35 and 37 are provided for storing the operation code and the operation code modifier respectively. The operation code, which will hereinafter be referred to more simply as the O*p* code, defines the fundamental operation to be performed by the instruction. The O*p* code modifier, or variant character, is used to extend the definitions supplied by the O*p* code.

The arithmetic unit 11 is further provided with a special clock and sequential cycle register 39 which is activated in accordance with the activation of the arithmetic unit itself. It is to be noted that, as regards the present invention, in the processing of a program instruction the arithmetic unit is utilized to identify the nature of the instruction and define the parameters involved. The operation of the arithmetic unit 11 is in turn synchronized with the operation of the peripheral devices associated with the interconnecting line 13, with the priority of processing being granted to the peripheral equipment. In this respect, the opportioning of memory cycle time intervals between the arithmetic unit 11 of the central processor and the peripheral devices is such that so long as peripheral demands are being generated for a particular read-write channel, the arithmetic unit is precluded from operating during that particular time cycle. Accordingly, the arithmetic clock and sequence cycle register 39 become operative only when a time interval allocated to a particular read-write channel is found not to be in demand by any of the peripheral devices.

The arithmetic clock and sequence cycle register 39, together with the O*p* code register 35 and the O*p* code modifier register 37, are connected to a subcommand decoder unit 41. The subcommand decoder 41 is in turn operatively connected to adder 29 and is further connected to the memory portion 10 and the peripheral devices via interconnecting line 13, to thereby define the sequence of activities during the extraction phase of each instruction.

Reference is now made to the adder portion of FIGURE 1 and in particular to the carry chain register 43. It is the function of the carry chain register 43 to selectively combine signals from corresponding stages of the A and B operand registers 31 and 33 with carry signals generated in the lower stages of the register 43. This selective combining of signals is effected in accordance with the signals generated within the subcommand decoder 41 which identify the current operation as being logical or arithmetic in nature.

A carry store register 45 is operatively connected to the carry chain register 43. Included as an input to the carry store register 45 is a connecting lead from the highest stage of the carry chain register 43. Accordingly, a carry signal propagated from the highest stage of a carry chain register will be fed back to the carry store register 45 and subsequently transferred as an input to the lowest stage of the carry chain register 43 during the operation on the next higher order of characters of the A and B operands. In order to effect certain logical operations, a carry signal will also be forced into the carry chain register 43. To activate this latter operation, means are provided for connecting the O*p* code register 35, and the output of a decimal carry decoder 47, to the carry store register 45.

Output signals from corresponding stages of the A and B registers 31 and 33 are combined with signals from the carry chain register 43 in the sum register 49. The output of the sum register 49 is connected to a sum decoder 51 wherein the signal representation is recoded into a decimal notation if the original representation was decimal, while for binary operations it may be allowed to pass through the decoder unchanged. The output of the sum decoder is transferred to the main memory local register 23 for subsequent storage in the main memory 15.

In a preferred embodiment of the present invention, the processing of data and instructions proceeds on a character basis with a single multibit character being transferred from main memory during each of the memory cycle subintervals. In any programmed operation, the first step is to remove from memory the next instruction to be processed. Thus, as an instruction is processed, the characters of the instruction are transferred one by one out of successive main memory locations into the various operational registers of the central processor and control memory. The typical program instruction may include as few as one character or as many as ten or more depending upon the type of instruction and the mode of addressing.

Basic to all instructions is a single character operation code which defines the fundamental operation to be performed. Most instructions also have two address portions designated as the A and the B address fields. The address portions may indicate the starting locations of the operand fields in the main memory 15. A variant character may also be included in the instruction format to modify the O*p* code of the instruction, thus in essence extending the fundamental definition applied thereby.

The processing of an instruction involving arithmetic or logical operation occurs in two operative steps; namely, the characters of the instruction are first extracted from main memory 15, whereafter the data identified by the extracted characters is operated upon. The extraction of an instruction is initiated with the contents of a location in main memory as specified by the sequence register of the control memory 17, being extracted therefrom and placed in the O*p* code register 35, after which the sequence register is incremented. The sequencing of successive steps is dependent upon the nature of the O*p* code extracted.

Consider now the processing of a program instruction which proceeds in the two-character mode of addressing; i.e., wherein two characters of information are utilized to express the A and B operand address fields. Then, in the operation of the embodiment of the present invention shown in FIGURE 1, the first character to be extracted during an available memory cycle subinterval is the O*p* code character which identifies the nature of the arithmetic or logical operation to be performed. Somewhat simultaneous with the extraction of the O*p* code character, the sequence register of control memory 17 is incremented. Accordingly, during the next available memory cycle subinterval the data contents of the location specified by the sequence register, as incremented, are placed in the leftmost character position of the A address register of control memory 17. The sequence register is then incremented and the information contained in the location specified therein is stored in the rightmost character position of the A address register of control memory 17. In a similar manner, the B address characters are processed with the data contents of the location specified in the sequence register being stored in the respective character positions of the B address register of control memory 17. If the operation is logical in nature and involves a variant character such as in the logical substitute operation, the data contents of the location in main memory 15 as specified by the sequence register of control memory 17, as incremented, are transferred to the O*p* code modifier register 37. With the processing of the variant character, the extraction portion of the instruction cycle is completed.

During the execution phase of the instruction, the information identified by the contents of the A address register of control memory 17, will be loaded into the A operand register 31 in either a normal or complemented representation in accordance with the nature of the operation to be performed. In this respect, the arithmetic subtract operation will be initiated by loading the information into the A address register 31 in a 1's or 9's complement representation according to whether the operation is binary or decimal respectively. In a similar manner, the information identified by the contents of the B address register of control memory 17 is loaded into the B operand register 33 in the same representation. Thereafter, corresponding bits of information, as stored in the A and B registers 31 and 33, are combined in the carry chain register 43 and signals indicating the resultant carry condition are transferred together with the information from the A and B registers to the sum register 49 whereby the successive bits of the resultant sum are generated. The resultant representation is subsequently transferred through the sum decoder 51 to be thereafter returned to the main memory local register 23 for restoring in the main memory 15 during a subsequent available memory cycle subinterval.

The function of the sum decoder 51 is best seen from an example involving a decimal add or subtract operation. Upon receipt in the O*p* code register 35 of a character identifying the decimal add or subtract operation, the first two digits of the A and B fields are combined as binary numbers modified by a possible carry from the right; whereafter the result, including the binary carry if any, is decoded by the sum decoder 51 into a decimal digit and a possible carry. Accordingly, a signal is transferred to the decimal carry decoder 47 upon receipt of the O*p* code character identifying the decimal operation. This enables the succeeding output signals from the sum register 49 to be gated into the decimal carry decoder 47 and reviewed therein to detect a decimal carry condition. The detection of a decimal carry initiates the transfer of a signal to the carry store register 45 to thereby force a carry into the low order bit position of the carry chain register 43. This carry is then added to the digital representation transferred from the A and B registers during the next succeeding operative cycle.

The signal indicating the decimal add or subtract operation is also transferred to the input of sum decoder 51. This signal conditions decoding means which operate upon the signal representation being decoded in the sum decoder 51, the signal representation originating in the sum register 49 is transferred back to the main memory local register 23 to be subsequently restored in the main memory storage location previously occupied by the digital representation of the B register 33.

The carry store register is also made to force a carry into the low order stage of the carry chain register 43 to complete the 2's or 10's complementation of the A operand during a binary or decimal subtract operation respectively. In a similar manner, a carry condition, brought forth from the high order position of the carry chain register 43 during a binary addition operation, is transferred to the carry store register 45 which in turn forces a carry into the low order bit position of the carry chain register 43 to be added to the digitial representation transferred therein by the A and B registers during the next succeeding operative cycle.

As mentioned above, in a perferred embodiment of the present invention the processing of data proceeds on a character basis with each binary character being comprised of six information bits and each decimal character being comprised of a binary coded decimal digit of four bits, with the exception of the low order character of each binary coded decimal field which in addition to the four information bits, is also comprised of two sign bits.

Reference is now made to FIGURES 2 and 3 which disclose the carry chain logic associated with the *n*th bit position of the sum register. FIGURE 4 discloses further logic associated with the *n*th bit position of the sum register. The substance of FIGURES 2, 3 and 4 are further depicted in FIGURES 5A and B which concern a more complete embodiment of the adder 29 of FIGURE 1 and the interrelation of the various data and control signals connected to the logical circuits comprising the respective stages thereof. The instruction repertoire of this embodiment of the subject system includes the ability to perform binary sum and difference operations, decimal sum and difference operations, substitute orders, and the execution of the logical product and exclusive OR operations.

Referring particularly to FIGURE 2, therein is shown a portion of the carry chain register of FIGURE 1 including a plurality of AND gates $G_1$ through $G_4$. Each of these gating devices is conditioned by at least one signal operational input associated with a logical operation capable of being executed therein. These signals are generated within the subcommand decoder 41 and transferred to the carry chain register 43 on the indicated interconnecting lines. Also combined as conditioning leads to the gating devices $G_1$ through $G_4$ are the assertion or negation signal representations of the *n*th bit of the A, B and V operands, as well as the negation of the carry condition for the $n-1$ bit. The outputs of the various gating devices $G_1$ through $G_4$ are buffered together to form the input to inverter $I_1$, the output of which may be considered as the carry condition for the $n-1$ bit position of this example. In accordance with the representation to be herein adopted forthe explanation of the logic circuitry of FIGURES 2, 3 and 4, the presence of "AND" conditioning signals on a gating device will force the output of the gate "up" which in turn, when delivered as an input to an inverter, forces the output of the inverter "down," in which case the represented output is designated as being "false."

Referring now to FIGURE 3, therein is shown a plurality of AND gates $G_5$ through $G_8$. AND gates $G_5$ through $G_7$ are conditioned by selective combinations of the *n*th bit representation for the A and B operands as well as an affirmative carry signal $C_{n-1}$ as generated in the logic circuitry of FIGURE 2. AND gate $C_8$ is conditioned by a signal operational input from the subcommand decoder 41, indicating that the logical operation being performed is in the form of a logical product which, as will be explained more fully below, initiates the forcing of a "1" in each stage of the carry chain generator 43. The outputs of the AND gates $G_5$ through $G_8$ are buffered together to form the input to an inverter $I_2$, the output representation of which forms a "carry not" signal for the *n*th stage of the carry chain register 43.

Referring now to FIGURE 4, therein is shown a plurality of gating devices $G_9$ through $G_{12}$, these gating devices being conditioned by selective combinations of the assertion signals to the *n*th bit of the A and B operands, as well as the assertion and negation signals for the $n-1$ and *n*th bit positions of the carry chain register. The outputs of the gating devices $G_9$ through $G_{12}$ are combined to form the input to an inverter $I_3$, the true representation of the output of which signifies a "sum not" signal for the *n*th bit positon of the sum register 49.

A more complete understanding of the logical representations of FIGURES 2, 3 and 4, which enable the system of the present invention to combine the arithmetic operations normally found in an adder with the logical operations usually implemented in associated registers, will be appreciated from a review of the various operations capable of being effected.

Accordingly, the following is an explanation of the exclusive OR operation as it is effected within the multifunction adder of the present invention. Consideration is first given to FIGURE 2 wherein it is seen that in an exclusive OR operation, gate $G_2$ thereof is conditioned by an input signal generated whhin the subcommand decoder 41 of FIGURE 1. The output signal of gate $G_2$ is then buffered to the input of inverter $I_1$. With the input to inverter $I_1$ "up," the output thereof will be "down" so that the representative function $C_{n-1}$ (that is, the carry from the $n-1$ stage) may be considered as "false." It should be noted that conventional circuit means, not shown, are provided to interconnect the output of the logical circuitry of FIGURE 2 to the input of the gates of the logic circuits of FIGURES 3 and 4.

The interpretation of the exclusive OR function may be expressed as a condition which will be satisfied provided a corresponding A bit or B bit for the *n*th stage is present, but which will not be satisfied if the A bit and the B bit or neither the A bit nor the B bit is present. Accordingly, gate $G_5$ of FIGURE 3 will not be conditioned to satisfy the exclusive OR relationship, nor will gates $G_6$ or $G_7$ be so conditioned, since it has already been stated that, upon the presence of an exclusive OR conditioning signal generated within the subcommand decoder 41, the input of gate $G_2$ of FIGURE 2 forces the output of inverter $I_1$ "down" so that the signal $C_{n-1}$ is "false." Since neither gates $G_5$, $G_6$ nor $G_7$ are conditioned the output thereof, which forms the input to inverter $I_2$, is "down" with the result that the output of inverter $I_2$ is "up" and the signal $\overline{C_n}$ is "true."

Along with the $n$th bit representation of signals A and B, and the carry condition from the $n-1$ bit position, the signals $\overline{C_n}$ are selectively combined to form the inputs to gates $G_9$ through $G_{12}$ of FIGURE 4. Attention is initially directed to the conditioning of gates $G_9$ and $G_{10}$. If the inputs of either gate $G_9$ or $G_{10}$ are satisfied, the output signal therefrom will force the output of inverter $I_3$ "down" so that the signal $\overline{S_n}$ will be "false." In terms of the present operation this will lead to the interpretation that the exclusive OR condition for the $n$th bits of operands A and B will be satisfied. The circuitry of FIGURE 3 precludes the possibility that the $n$th bit of operands A and B will both be the same since this will lead to the conditioning of gate $G_5$ thereby precluding the possibility that the output of inverter $I_2$, namely $\overline{C_n}$, will be "true" which is a necessity for the conditioning of gates $G_9$ and $G_{10}$. Gates $G_{11}$ and $G_{12}$ are both precluded from being satisfied in the exclusive OR operation since the conditioning of both these gates is dependent upon a "true" representation of signal $C_{n-1}$, a condition which has already been shown to be "false" in the execution of the logical product function.

Another logical operation capable of being performed by the multifunction adder of the present invention is the logical substitute order wherein the bits of a variant character in essence form a mask for placing the bits of an A operand into the corresponding bit positions of a B operand. More specifically, the A bit representation is passed to the B bit location if the corresponding variant bit is a "1"; while the B bit is preserved if the corresponding variant bit is a "0." The operation of the logic circuitry of FIGURES 2, 3 and 4 during the performance of the logical substitute order will be apparent from a review of the possible combinations of the A, B and variant bits as set out in the following examples:

| | A | B | V | R |
|---|---|---|---|---|
| (1) | 1 | 1 | 0 | 1 |

The above representation indicates that the resultant bit, which is to be stored in the B location in accordance with the above outlined rules, is independent of the A bit inasmuch as the corresponding bit of the variant character is a "0." Thus the bit of the character to be stored in the B location is the same as that previously stored therein. Since neither gate $G_1$, $G_2$, $G_3$ or $G_4$ is conditioned, the output of inverter $I_1$ will remain "up" and the signal $C_{n-1}$ will be "true." Signal $C_{n-1}$ is in turn combined with the signals $A_n$ and $B_n$ so as to condition gate $G_{11}$ thereby driving the output of inverter $I_3$ "down" making $\overline{S_n}$ "false" and thereby indicating a sum status of "1" for for that particular bit location.

| | A | B | V | R |
|---|---|---|---|---|
| (2) | 1 | 1 | 1 | 1 |

The explanation of Example 2 follows the identical actuating path as outlined above for Example 1. A similarly is to be noted here in that both instances the bit to be restored is identical to that previously located therein. This result is to be expected from the nature of the corresponding A and B bits which in both instances were "1's."

| | A | B | V | R |
|---|---|---|---|---|
| (3) | 1 | 0 | 0 | 0 |

The explanation of the functioning of the logic circuits in this example finds the ouput of inverter $I_1$ up so that the signal representation $C_{n-1}$ is "true" thereby enabling the conditioning of gate $G_6$. This drives the output of inverter $I_2$ "down," thus making $\overline{C_n}$ "false." $C_{n-1}$ "true" and $\overline{C_n}$ "false" are thus not combinable to condition any of the gates $G_9$, $G_{10}$, $G_{11}$ or $G_{12}$ so that the output of inverter $I_3$ remains "up" and the signal $\overline{S_n}$ is "true."

| | A | B | V | R |
|---|---|---|---|---|
| (4) | 1 | 0 | 1 | 1 |

This signal representation is a natural for the conditioning of gate $G_4$ which in turn drives the output of inverter $I_1$ "down" so as to make $C_{n-1}$ "false." This in turn precludes the conditioning of gates $G_6$ and $G_7$ so that the signal $\overline{C_n}$ at the output of inverter $I_2$ remains "true." Also, the fact that $B=0$ means that gate $G_5$ remains deconditioned and further ensures that the output of inverter $I_2$ will remain "true." This further provides the necessary conditioning of gate $G_9$ to thereby drive the output of inverter $I_3$ "down" so as to indicate a "false" condition for the signal $\overline{S_n}$.

| | A | B | V | R |
|---|---|---|---|---|
| (5) | 0 | 0 | 1 | 0 |

The conditioning of the logic circuits of FIGURES 2, 3 and 4 follow the same path as that established in Example 4, except that the determination of the resultant bit to be restored in the B location is determined by the nature of the $A_n$ bit representation which in this instance is a "0."

| | A | B | V | R |
|---|---|---|---|---|
| (6) | 0 | 0 | 0 | 0 |

The signal representation of this example is a natural for conditioning gate $G_3$ so that as the output of inverter $I_1$ goes "down" the signal representation $C_{n-1}$ becomes "false." Since none of the gates of FIGURE 3 are satisfied, the output of inverter $I_2$ stays "up," but since $C_{n-1}$ is "false" it precludes the possibility of conditioning gate $G_{12}$. Gates $G_9$, $G_{10}$ and $G_{11}$ are likewise precluded from being conditioned by the absence of either an $A_n$ or $B_n$ bit. Thus, the output of the inverter $I_3$ remains "up" and the signal representation $\overline{S_n}$ is "true."

| | A | B | V | R |
|---|---|---|---|---|
| (7) | 0 | 1 | 0 | 1 |

The signal representation of this example is a natural for the conditioning of gate $G_3$ which in turn causes the output of inverter $I_1$ to go "down," thereby making the statement $C_{n-1}$ "false." With $C_{n-1}$ "false," gates $G_6$ and $G_7$ remain deconditioned thereby enabling the output of inverter $I_2$ to remain "up" so that the statement $\overline{C_n}$ is "true." The combination of $B_n$ and $\overline{C_n}$ thereby condition $G_{10}$ so as to drive the output of inverter $I_3$ down and establish the signal $\overline{S_n}$ as being "false."

| | A | B | V | R |
|---|---|---|---|---|
| (8) | 0 | 1 | 1 | 0 |

Since neither $G_1$, $G_2$, $G_3$ or $G_4$ is conditioned by the inputs of this example, the output of inverter $I_1$ remains "up" and the statement $C_{n-1}$ is "true." $C_{n-1}$ is combined with the signal $B_n$ to condition the gate $G_7$ of FIGURE 3 thereby driving the output of inverter $I_2$ "down" to make the statement $\overline{C_n}$ "false." with $\overline{C_n}$ "false," the possibility of conditioning gates $G_9$, $G_{10}$ and $G_{12}$ is precluded and without signal $A_n$, gate $G_{11}$ cannot be conditioned. Thus the output of inverter $I_3$ remains up and the signal $\overline{S_n}$ is "true."

A third logical function capable of being effected by the adder of the present invention is the formation of the logical product. In order to effect an output signal $S_n$ from the inverter $I_3$ of FIGURE 4, in response to the logical product operation, it is not necessary to utilize the logical circuitry of FIGURE 2. Rather, the execution of this order is effected by automatically conditioning gate $G_8$ so as to drive the output of inverter $I_2$ "down" and consequently establishing a "false" condition for $\overline{C_n}$. Since the signal $\overline{C_n}$ is necessary to the conditioning of gates $G_9$, $G_{10}$ and $G_{12}$ of FIGURE 4, only gate $G_{11}$, when properly conditioned, is capable of driving the output of inverter $I_3$ "down" so as to establish a "false" condition for signal $\overline{S_n}$. The effect of the logical product signal applied to gate $G_8$ is to force a carry condition in each stage of the adder so that the presence of $A_n$ and $B_n$ in a particular bit position will establish an output signal $S_n$ for that particular stage.

The arithmetic operations of binary and decimal add and subtract are capable of being effected by the common circuitry outlined above. In this respect, in the binary add operation, if the summation of the corresponding bits $A_{n-1}$ and $B_{n-1}$ are not effective in producing a carry signal $C_{n-1}$, the conditioning of gate $G_1$ of FIGURE 2 will be established, thereby driving the output of inverter $I_1$ "down" so as to make the statement $C_{n-1}$ "false." This simply indicates that there is no carry being brought forward from the preceding stage. If this condition is established, then of the gates $G_5$ through $G_8$, $G_5$ is the only gate capable of being conditioned and this is contingent upon the corresponding bits $A_n$ and $B_n$ both being "1's." If these latter conditions are met, the output of inverter $I_2$ goes "down" and the statement $\overline{C_n}$ is "false." Since $\overline{C_n}$ and $C_{n-1}$ are both "false," gates $G_9$, $G_{10}$ and $G_{11}$ or $G_{12}$ cannot be conditioned and the output of inverter $I_3$ will remain "up" thereby affirming the statement $\overline{S_n}$.

Alternatively, if the signal $\overline{C_{n-1}}$ were "false" and *either* signal $A_n$ or $B_n$ was a "1," then gates $G_6$ or $G_7$ would be conditioned so as to drive the output of inverter $I_2$ "down" and make the statement $\overline{C_n}$ "false." With $\overline{C_n}$ "false," gates $G_9$, $G_{10}$ and $G_{12}$ are precluded from being conditioned; similarly, gate $G_{11}$ is precluded since only $A_n$ *or* $B_n$ was assumed to be a "1." Under these circumstances, the output of inverter $I_3$ remains "up" and the statement $\overline{S_n}$ is "true."

If, however, $\overline{C_{n-1}}$ is "false," and $A_n$ and $B_n$ are both "1's," then the output of inverter $I_2$ will be driven "down" by the combined or individual action of gates $G_5$, $G_6$ and $G_7$ so that the statement $\overline{C_n}$ remains "false." Since $\overline{C_{n-1}}$ is "false," $\overline{C_{n-1}}$ must be "true." Thus, the signals $A_n$, $B_n$ and $C_{n-1}$ combined in gate $G_{11}$ drive the output of the inverter $I_3$ "down" so as to make the statement $\overline{S_n}$ "false."

In the situation where both $A_n$ and $B_n$ are "0's" and $\overline{C_{n-1}}$ is "true," gate $G_1$ is conditioned so that the output of inverter $I_1$ will be driven "down" and $C_{n-1}$ will be "false". Alternatively, with $A_n$ and $B_n$, both "0's" and $\overline{C_{n-1}}$ "false," $\overline{C_{n-1}}$ would remain "true." However, the conditioning of gates $G_5$ through $G_8$ of FIGURE 3 is independent of the nature of signal $C_{n-1}$, since in all cases a necessary condition is that $A_n$ or $B_n$, or both, be "1's." Thus, in both cases $\overline{C_n}$ will remain "true." With $C_n$ true, and $A_n$ and $B_n$ both "0's," conditioning of the gating circuitry of FIGURE 4 can only occur in gate $G_{12}$. This in turn is made dependent upon the nature of the signal $C_{n-1}$ which, when true, conditions gate $G_{12}$ so as to drive the output of inverter $I_3$ "down" and make $\overline{S_n}$ "false."

As mentioned above, the binary subtract operation is initiated by transferring the information into the A operand register 31 in a "1's" complement representation, whereafter it is added to the data in the B field and the results stored in the B field address of main memory in accordance with the normal operating routine. In the institution of the binary subtract instruction a carry is transferred from the carry store register 45 to the low order stage of the carry chain register 43 to complete the "2's" complementation. In a somewhat similar manner, the decimal subtract operation is initiated by transferring the digital representation from the memory local register 23 into the A register 31 in a "9's" complement representation and again forcing a carry into the low order stage of the carry chain register 43 from the carry store register 45 to thereby complete the 10's complementation.

While in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new is:

1. An information handling apparatus for manipulating a plurality of operands each of which is comprised of a plurality of mutually exclusive information bits, a first-level gating circuit having a plurality of inputs connected thereto, said plurality of inputs connected to said first level gating circuit including signals representative of corresponding bits of said plurality of operands, a second-level gating circuit having a plurality of inputs connected thereto, means connecting the output of said first-level gating circuit together with said signals representing said corresponding bits of said plurality of operands as inputs to said second-level gating circuit, a third-level gating circuit, and means connecting the output of said first and second level gating circuits together with said signals representing said corresponding bits of said plurality of operands as inputs to said third-level gating circuit, said plurality of inputs connected to said first- and second-level gating circuit further including a plurality of logical control signals, and means for selectively activating said plurality of logical control signal inputs to said first- and second-level gating circuits to thereby enable said information handling apparatus to satisfy any one of a plurality of both logical and arithmetic operations.

2. A multifunction adder adapted to effect both arithmetic addition and subtraction as well as the execution of certain logical operations comprising a first and second multiposition register for storing a digital representation of successive bits of an A and a B operand, a multistage carry chain register including means operatively connecting successive bit locations of said first and second multiposition registers to an associated stage of said carry chain register wherein carry signals are generated in accordance with the nature of the signals stored in the associated bit locations of said first and second registers, said carry chain register further including a plurality of signal operational inputs, each of said inputs being associated with a separate logical function which will cause the associated signal input to become active when an operation is to be performed with respect to said logical function, first gating means including a plurality of gating devices, each of said gating devices having at least one of said plurality of signal operational inputs connected therewith, a sum register, means connecting corresponding stages of said first and second registers and said carry chain register to said sum register whereby the output signals from successive stages of said sum register represent the resultant of an arithmetic or logical operation in accordance with the nature of said signal operational inputs.

3. In combination, a plurality of signal operational inputs, each of said inputs being associated with a separate logical function in a manner to cause the associated signal input to be active when an operation is to be performed with respect to the related logical function, first gating means including a plurality of gating devices, each of said gating devices having at least one of said plurality of signal operational inputs connected thereto, a first and a second multistage register for storing a digital representation of successive bits of an A and a B operand, a multistage carry chain register, each stage of said carry chain register being operatively connected to a corresponding stage of said first and second registers and including second gating means, said second gating means being conditioned in part by the output of said first gating means and in part by the corresponding bits of said A and B operands, a multistage sum register, means connecting corresponding bit positions of said first and second registers and said carry chain register to said sum register whereby said combination is enabled to effect both arithmetic and logic operations.

4. A multifunction adder adapted to perform binary and decimal addition and subtraction as well as certain logical operations, comprising a first and second multiposition register for storing a digital representation of successive bits of an A and a B operand, a multistage carry chain register, means connecting corresponding stages of said first and second registers and said multistage carry chain register, a plurality of signal operational inputs operatively connected to said carry chain register, first gating means, said first gating means including a plurality of gating devices, each of said gating devices having at least one of said plurality of signal operational inputs connected therewith, a sum register, means connecting said first and second registers and said carry chain register to said sum register whereby said normal arithmetic operation of said adder is supplemented by the ability to selectively execute certain logical operations therein.

5. A multifunction adder adapted to perform binary and decimal addition and subtraction as well as certain logical operations comprising first and second operand storage means, a multistage carry chain register comprising first level gating means, a plurality of signal operational inputs each of said inputs being associated with a separate logical function, said first level gating means including a plurality of gating devices each having at least one of said plurality of signal operational inputs connected thereto, said gating devices being selectively conditioned by signals from said first and second operand storage means, said multistage carry chain generator further comprising second level gating means, said second level gating means including a plurality of gating devices, each of said gating devices of said second level gating means being conditioned in part by the output of said first level gating means and in part by said signals from said first and second operand storage means, a multistage sum generator comprising third level gating means, said third level gating means including a plurality of gating devices, each of said gating devices of said third level gating means being conditioned in part by the output of said first and second operand storage means and in part by the outputs of said multistage carry chain register.

6. A multifunction adder comprising first and second multiposition registers for storing a digital representation of an A and a B operand, a multistage carry generator, each stage of said carry generator including a plurality of gating means, a multistage sum register, means connecting corresponding stages of said first and second register and said carry register to said sum register, and means including a plurality of operational inputs connected as conditioning means to the input of said gating means associated with each stage of said carry generator which when selectively actuated enables said adder to perform both logical and arithmetic operations.

7. In a gated logic computing apparatus adapted to perform any one of a plurality of both arithmetic and logical operations, register means for storing a first and a second operand, means including a plurality of gating devices for selectively combining said first and second operands, a plurality of signal operational inputs, each of said signal operational inputs being associated with a separate logical function which cause the associated signal input to become active when an operation is to be performed with respect to the relative logical function, means connecting at least one of said plurality of signal operational inputs to said gating devices associated with said first and second operands, and means to withhold said logical operation-inducing inputs from said gating means for combining said first and second operands to thereby enable said computing apparatus to effect said arithmetic operations.

8. In a gated logic computer adapted to perform both arithmetic and logical operations comprising first and second multiposition registers for storing a digital representation of an A and a B operand, a sum register, carry generating means, said carry generating means including means capable of being selectively conditioned by a signal identifying a particular logical or arithmetic operation to be performed, and means connecting said first and second registers and said carry generating means to said sum register to enable said gated logic computer to perform a selected operation.

9. An information handling apparatus for manipulating a plurality of operands each of which is comprised of a plurality of bits of information, means for generating a carry signal for corresponding bits of said operands which carry signal weighs in the relationship established between bits of said operands of increased significance, and means connected with said carry signal generating means which when selectively energized enables said information handling apparatus to express relationships between corresponding bits of said plurality of operands which are independent of the relationship established for bits of lesser significance.

10. In a multifunction adder the combination comprising, a plurality of signal operational inputs each of which is associated with a separate logical operation, a multistage carry chain register comprising first level gating means, said first level gating means including a first plurality of gating devices, said first plurality of gating devices being partially conditioned by corresponding pairs of digits of an A and a B operand, each of said first plurality of gating devices further having at least one of said plurality of signal operational inputs connected therewith, said first level gating means further comprising first normally operative means having the outputs of said first plurality of gating devices connected as a common input thereto, means for conditioning any of said plurality of gating devices to thereby terminate the output of said first normally operative means, said multistage carry chain register further comprising second level gating means, said second level gating means including a second plurality of gating devices, the output signal of said first normally operative means being connected as an input to at least two of said second plurality of gating devices, said second plurality of gating devices being further conditioned by corresponding pairs of digits of said A and B operands, said second level gating means further comprising second normally operative means having the outputs of said second plurality of gating devices connected as a common input thereto, means for conditioning any of said second plurality of gating devices to thereby terminate the output of said second normally operative means, and a multistage sum generator comprising third level gating means, said third level gating means including a third plurality of gating devices, said third plurality of gating devices being conditioned in part by corresponding digits of said A and B operands and in part by the outputs of said first and said second normally operative means, said third level gating means further comprising third normally operative means having the outputs of said third plurality of gating devices connected as a common input thereto, means for conditioning any of said third plurality of gating devices to thereby terminate the output of said third normally operative means, said combination being normally operative of effect the arithmetic addition or subtraction of the digital representation of said A and B operands but which is responsive to a signal operational input representative of an associated logical function to effect an operation in accordance therewith.

11. A three-level logical gating apparatus for alternatively generating any one of a plurality of both logical and arithmetic functions relative to a pair of input operands having their respective informational contents expressed in one or the other of two mutually exclusive states, a first-level gating circuit comprising a plurality of gating means and having connected as conditioning inputs thereto selective combinations of signals representing said pair of input operands and control signals defining the nature of the operation as being of a particular logical or arithmetic nature, a second-level gating circuit, means selectively coupling the output of said first-level gating circuit to the input of said second-level gating circuit in combination with said signals representing said pair of input operands, a third-level gating circuit, and means selectively coupling the outputs of said first- and second-level gating circuits in common to the input of said third-level gating circuit in combination with said signals representing said pair of input operands whereby the output of said third level gating circuit represents the resultant of an arithmetic or logical operation in accordance with the nature of said control signals.

12. Apparatus as claimed in claim 11 wherein first logical control signals are connected to said first-level gating circuit and second logical control signals are connected to said second-level gating circuit.

13. Apparatus as claimed in claim 11 wherein each of said first- and second-level gating circuits are further comprised of a plurality of gating devices partially conditioned by logical control signals connected thereto.

References Cited

UNITED STATES PATENTS

| | | | |
|---|---|---|---|
| 3,028,088 | 4/1962 | Dunham | 235—164 |
| 3,198,939 | 8/1965 | Helbig et al. | 235—175 |

MALCOLM A. MORRISON, *Primary Examiner.*

MARTIN P. HARTMAN, *Assistant Examiner.*